(12) United States Patent
Sato et al.

(10) Patent No.: US 6,277,047 B1
(45) Date of Patent: Aug. 21, 2001

(54) AUTOMATIC TRANSMISSION (75) Inventors: Keiji Sato; Jun Nakayama; Naoto Suzuki; Tadao Fujisawa; Masato Sawaoka, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,528

(22) Filed: Dec. 1, 1999

(30) Foreign Application Priority Data

Dec. 2, 1998 (JP) .................................................. 10-342770

(51) Int. Cl.[7] .................................................... F16H 61/04

(52) U.S. Cl. .......................... 475/148; 475/144; 475/297; 477/143

(58) Field of Search ..................................... 475/144, 148, 475/297; 477/121, 143

(56) References Cited

U.S. PATENT DOCUMENTS

| 4,098,148 | * | 7/1978 | Wayman .............................. 475/148 |
| 4,747,323 | * | 5/1988 | Kiuchi et al. ......................... 475/148 |
| 4,864,892 | * | 9/1989 | Ando et al. ........................... 475/144 |
| 4,890,512 | * | 1/1990 | Kano et al. ........................... 475/144 |
| 5,730,683 | * | 3/1998 | Usuki et al. .......................... 477/143 |

* cited by examiner

Primary Examiner—Sherry Estremsky
(74) Attorney, Agent, or Firm—Martin A. Farber (57) ABSTRACT

An automatic transmission comprises a friction engaging means having a plurality of first plates spline-fitted to a hub and a plurality of second plates spline-fitted to a drum and disposed in an interleaving relation to the first plates, an one-way clutch provided in the hub and having a plurality of sprags for locking the rotation of the hub when the hub rotates in a locking direction and a control means for temporarily releasing the friction engaging means for a specified timespan when the friction engaging means is in an engagement condition and when the hub rotates in a locking direction.

6 Claims, 8 Drawing Sheets

| SELECTOR POSITION | | REVERSE CLUTCH | 2&4 BRAKE | HIGH CLUTCH | LOW CLUTCH | LOW & REVERSE BRAKE | LOW ONE-WAY CLUTCH |
|---|---|---|---|---|---|---|---|
| P | | | | | | | |
| R | | ○ | | | | ○ | |
| N | | | | | | | |
| D | 1st | | | | ○ | | ◎ |
| | 2nd | | ○ | | ○ | | |
| | 3rd | | | ○ | ○ | | |
| | 4th | | ○ | ○ | | | |
| 3 | 1st | | | | ○ | | ◎ |
| | 2nd | | ○ | | ○ | | |
| | 3rd | | | ○ | ○ | | |
| | 4th | | ○ | ○ | | | |
| 2 | 1st | | | | ○ | | ◎ |
| | 2nd | | ○ | | ○ | | |
| | 3rd | | | ○ | ○ | | |
| | 4th | | ○ | ○ | | | |
| 1 | 1st | | | | ○ | ○ | ◎ |
| | 2nd | | ○ | | ○ | | |
| | 3rd | | | ○ | ○ | | |
| | 4th | | ○ | ○ | | | |
| SPORT | 1st | | | | ○ | ○ | ◎ |
| | 2nd | | ○ | | ○ | | |
| | 3rd | | | ○ | ○ | | |
| | 4th | | ○ | ○ | | | |

REMARKS: ○ ENGAGED
◎ ENGAGED ONLY WHEN ACCELERATED AT 1ST SPEED
NO MARK RELEASED

AUTOMATIC TRANSMISSION

BACKGROUND OF THE INVENTION

1. Field of the Invention

The present invention relates to an automatic transmission, and more particularly, to an engagement control for a friction device of an automatic transmission.

2. Background Art

An automatic transmission for a motor vehicle has a planetary gear set constituted of sun gears, ring gears, pinions and the like. The speed change of the transmission is accomplished by engaging or releasing friction devices such as multiple-disc clutches or multiple-disc brakes. Generally, the friction devices comprise a plurality of drive plates connected to an input side and a plurality of driven plates connected to an output side disposed in an interleaving relation to the drive plates. When a pressure of a pressure plate is applied to those drive and driven plates, power is transmitted from the drive plates to the driven plates through a frictional contact therebetween.

Besides these multiple-disk type friction elements, a one-way clutch is used for engaging or releasing gears in some type of automatic transmissions. For example, in a sport-shift type automatic transmission whose gear selection can be performed manually, the one-way clutch is locked to engage a first speed gear together with an concurrent engagement of a multiple-disk brake.

Figure 8:
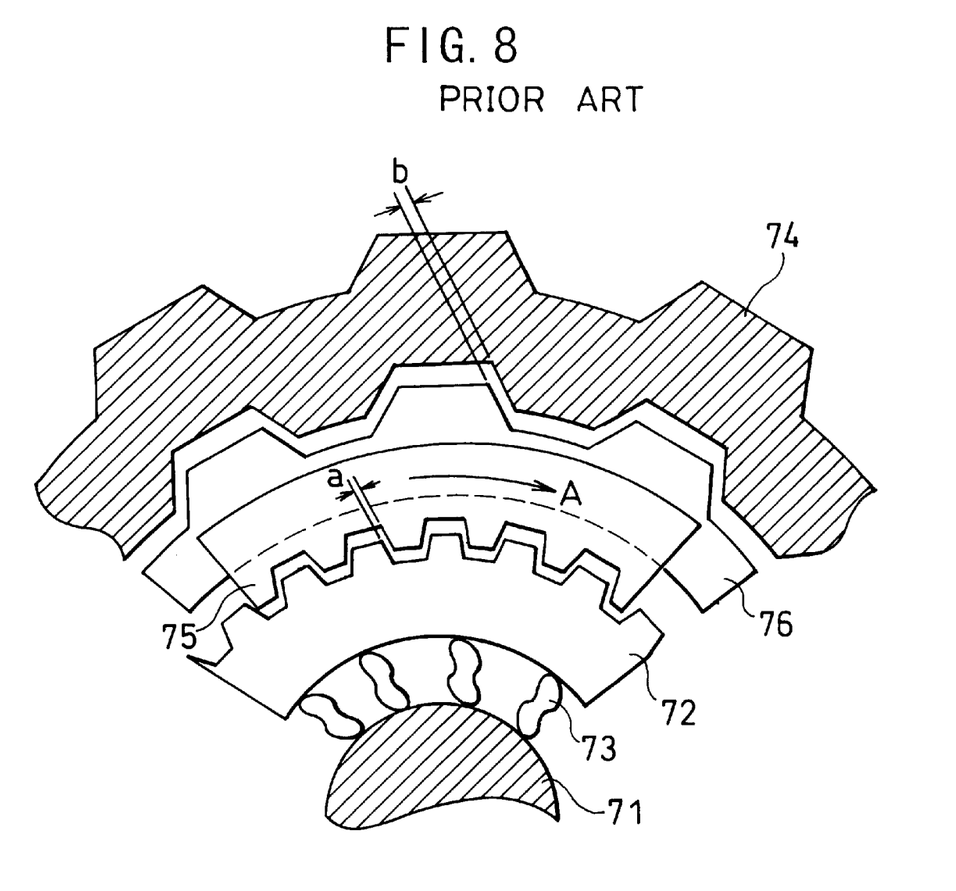
FIG. 8 is a sectional view showing a construction of a multiple-disk friction element having a one-way clutch on a hub side according to the prior art.

FIG. 8 is a cross sectional view showing a construction of a one-way clutch with a multiple-disk friction element according to a prior art. The one-way clutch comprises an inner race 71, a hub (outer race) 72 and a plurality of sprags 73 disposed between the inner race 71 and the hub 72. When the sprags 73 are arranged as shown in FIG. 8, in case where the hub 72 rotates in a locking direction A (clockwise direction in the drawing), for example in case of acceleration at 1st speed, the sprags 73 rise to engage the inner race 71 with the hub 72, thereby the rotation of the hub 72 is locked. On the other hand, in case where the hub 72 rotates in a couterclockwise direction (in a contrary direction to A), for example in case of deceleration at 1st speed, the sprags 73 fall sideways to allow the rotation of the hub 72. Further, drive plates 75 and driven plates 76 are arranged interchangeably in an axial direction of the hub 72. The drive plates 75 are spline-fitted to the hub 72 and the driven plates 76 are spline-fitted to a transmission housing 74. Thus, a brake mechanism is formed by the hub 72, the transmission housing 74 and the friction plates 75, 76. The inner race 71 is fixed to the transmission housing 74.

Considering a case where the hub 72 rotates in the locking direction A in a condition of the brake applied, first when the hub 72 rotates in the locking direction A, the sprags 73 start rising. Note that the hub 72 is not locked unless the sprags 73 rise. That is, the locking force of the one-way clutch is generated by rotating the hub 72 by a rotation amount necessary for raising up the sprags 73. Accordingly, the rotation of the hub 72 is restricted by either locking force of the one-way clutch or the one of the brake. As a result of this, sometimes the braking or locking force of the brake operates before the locking force of the one-way clutch is generated.

That is, as shown in FIG. 8, when the hub 72 rotates in the direction A, the clearance "a" (so-called backlash) in the fitting portions between the hub 72 and the drive plate 75 is closed so as to rotate the drive plate 75 in the direction A. At this moment, since the drive plate 75 is engaged with the driven plate 76, the driven plate 76 is also rotated in the direction A. Accordingly, the clearance or backlash "b" in the fitting portions between the driven plate 76 and the transmission housing 74 is also closed and the protrusions of the driven plate 76 abut against the tooth face of the spline. Thus, a load according to the torque of the hub 72 and the degree of the engagement of the plates 75 and 76 is applied to the protrusions of the friction plates 75, 76. When the vehicle makes a sudden start, since this load becomes very large, the driven plate 76 is fatigued to lose endurance. On the other hand, in order to enhance the endurance or strength of the friction plates, the use of a material of high grade provides the automatic transmission with an increase in cost.

SUMMARY OF THE INVENTION

It is an object of the present invention to provide an automatic transmission having a friction device to which a reduced load is applied so that fatigues of the friction device are minimized.

To this object, the automatic transmission according to the present invention comprises a friction engaging means including a plurality of first plates spline-fitted to a hub and a plurality of second plates spline-fitted to a drum and disposed in an interleaving relation to the first plates, an one-way clutch provided in the hub and having a plurality of sprags for locking the rotation of the hub when the hub rotates in a locking direction and a control means for temporarily releasing the friction engaging means for a specified timespan when the friction engaging means is in an engagement condition and when the hub rotates in a locking direction.

Further, the timespan is established at a longer time than a time needed for locking the rotation of the hub. Further, the control means is designed to start to release the friction engaging means when a throttle opening angle exceeds a specified value.

DESCRIPTION OF PREFERRED EMBODIMENTS

Figure 1:
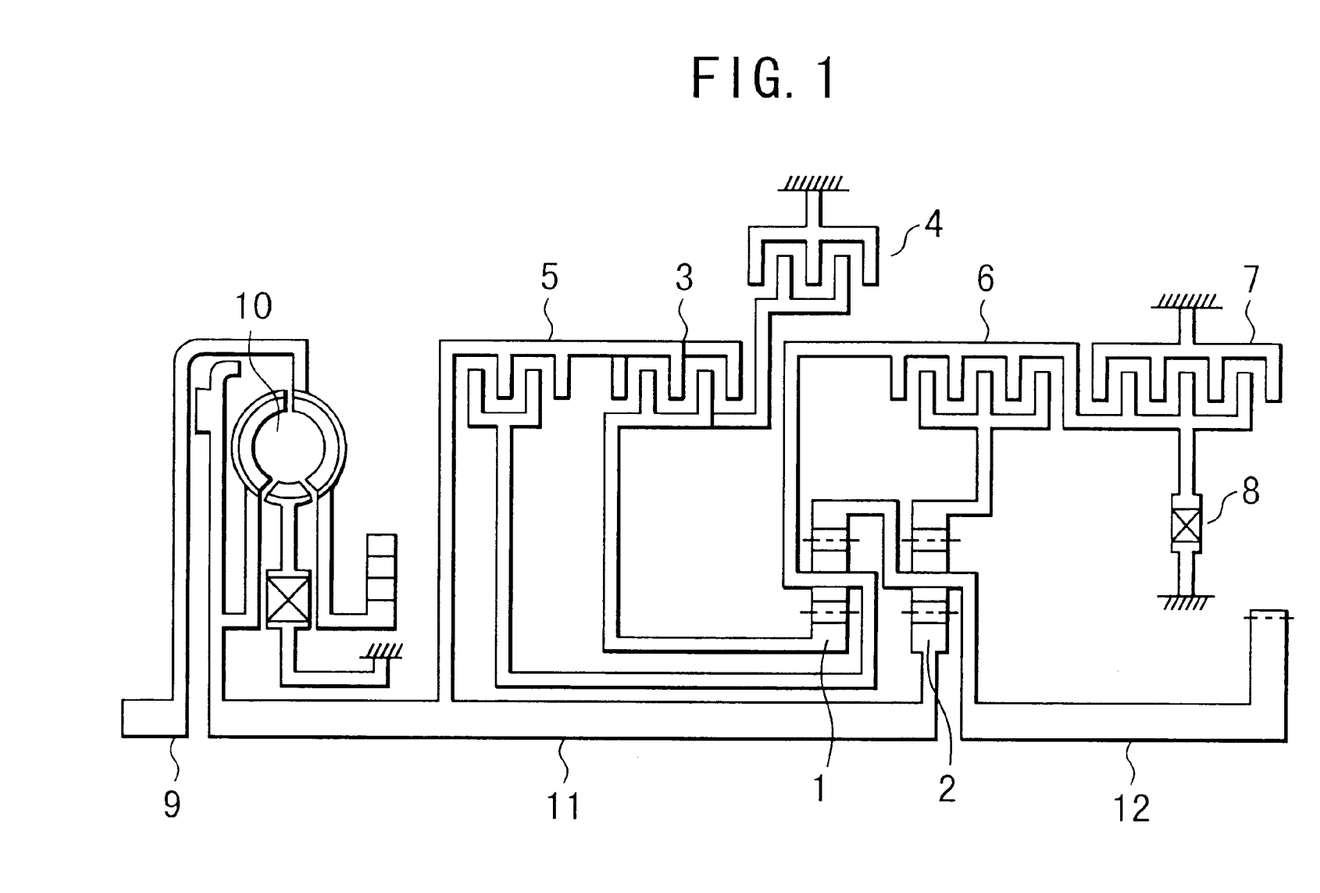
FIG. 1 is a schematic diagram showing an arrangement of gearing, a torque converter, clutches and brakes for an automatic transmission according to the present invention.

FIG. 1 is a schematic diagram showing an arrangement of gears, a torque converter, clutches and brakes for an automatic transmission. In the drawing, driving force of a crank shaft 9 of an engine is transmitted to a turbine shaft 11 through s torque converter 10. The turbine shaft 11 which is an input shaft of the automatic transmission is drivingly connected to a sun gear of a rear planetary gear set 2. On the other hand, a reduction drive shaft 12 which is an output shaft of the transmission is drivingly connected to a ring gear of a front planetary gear set 1 and a planetary carrier of the rear planetary gear set 2. Respective members, namely sun gears, pinions, ring gears and planetary carriers, of the front and rear planetary gear sets 1, 2 are drivingly connected to three multiple-disk clutches (reverse clutch 3, high clutch 5 and low clutch 6), two multiple-disk brakes (2 & 4 brake 4 and low & reverse brake 7) and a low one-way clutch 8. These friction elements (clutches and brakes) are selectively engaged or released so as to obtain desired gear ratios (in this embodiment, four forward gear ratios and one reverse gear ratio) determined according to miscellaneous parameters such as throttle opening angles and the like.

Figure 2:
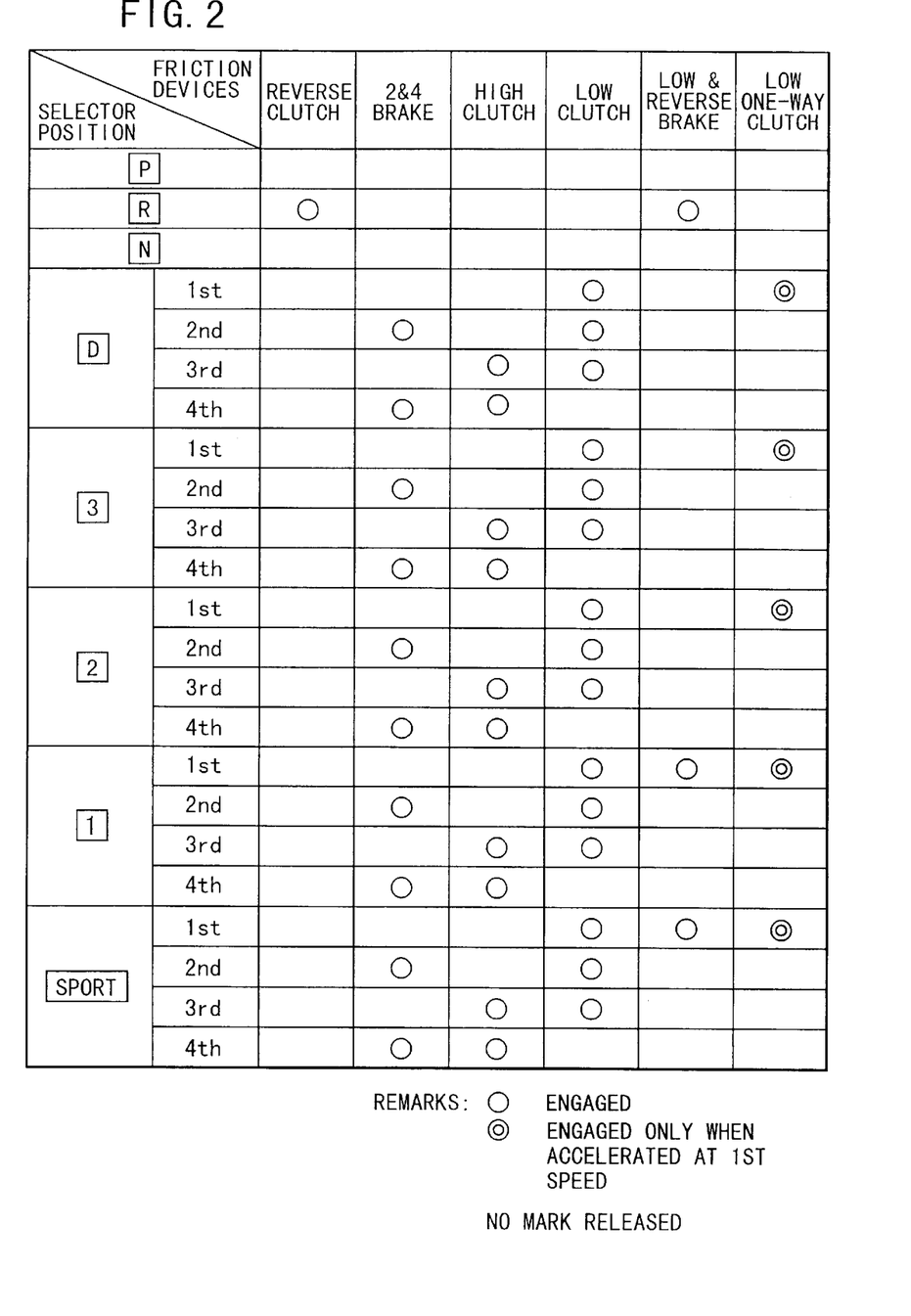
FIG. 2 is a diagram showing a relationship between gear positions and an engaged state of friction devices.

FIG. 2 is a diagram showing a relationship between gear positions and an engagement state of friction devices. For example, when a select lever is positioned at "D" (drive) range and the gear is engaged in 2nd speed, the 2 & 4 brake and low clutch are engaged and other clutches and brakes are released. In this automatic transmission, basically the gear change is accomplished by releasing the friction element of a former stage and engaging the one of a next stage.

The low & reverse brake 7 is engaged at "R" (reverse) range of the select lever, at 1st speed at "SPORT" mode of the select lever and at 1st speed at "1" range. Consequently, when the select lever is shifted to "SPORT" mode from "D" range in a state of 1st speed, the low & reverse brake 7 is engaged. In this case, since the input torque in acceleration is received by the low one-way clutch 8, basically it is not necessary to engage the low & reverse brake 7. However, the input torque in deceleration (idle direction of one-way clutch 8) can not be adequately received only by the one-way clutch 8. Hence, at ranges where engine brake is required, that is, at "1" range or "SPORT" mode, the low & reverse brake 7 is also engaged. Here, describing the "SPORT" mode, there is provided another gate (shift indicator) for the "SPORT" mode, besides the normal gate like P-R-N-D-3-2-1. In the "SPORT" mode, the shifting-up or shifting-down are obtained by operating a shift knob manually. The shifting in "SPORT" mode may be performed by operating an up/down switch provided in a steering wheel.

When the low one-way clutch 8 is operated at starting with 1st speed in the "SPORT" mode, the backlash or clearance of the spline coupling portion of the low & reverse brake 7 starts to close. At this moment, when the backlash of the low & reverse brake 7 is closed before the low one-way clutch 8 is engaged, a load corresponding to the degree of acceleration is exerted on the protrusions of the friction plates of the low & reverse brake 7. The present invention is aimed at attenuating the load exerted on the friction plates by controlling a hydraulic pressure applied to the low & reverse brake 7.

Figure 3:
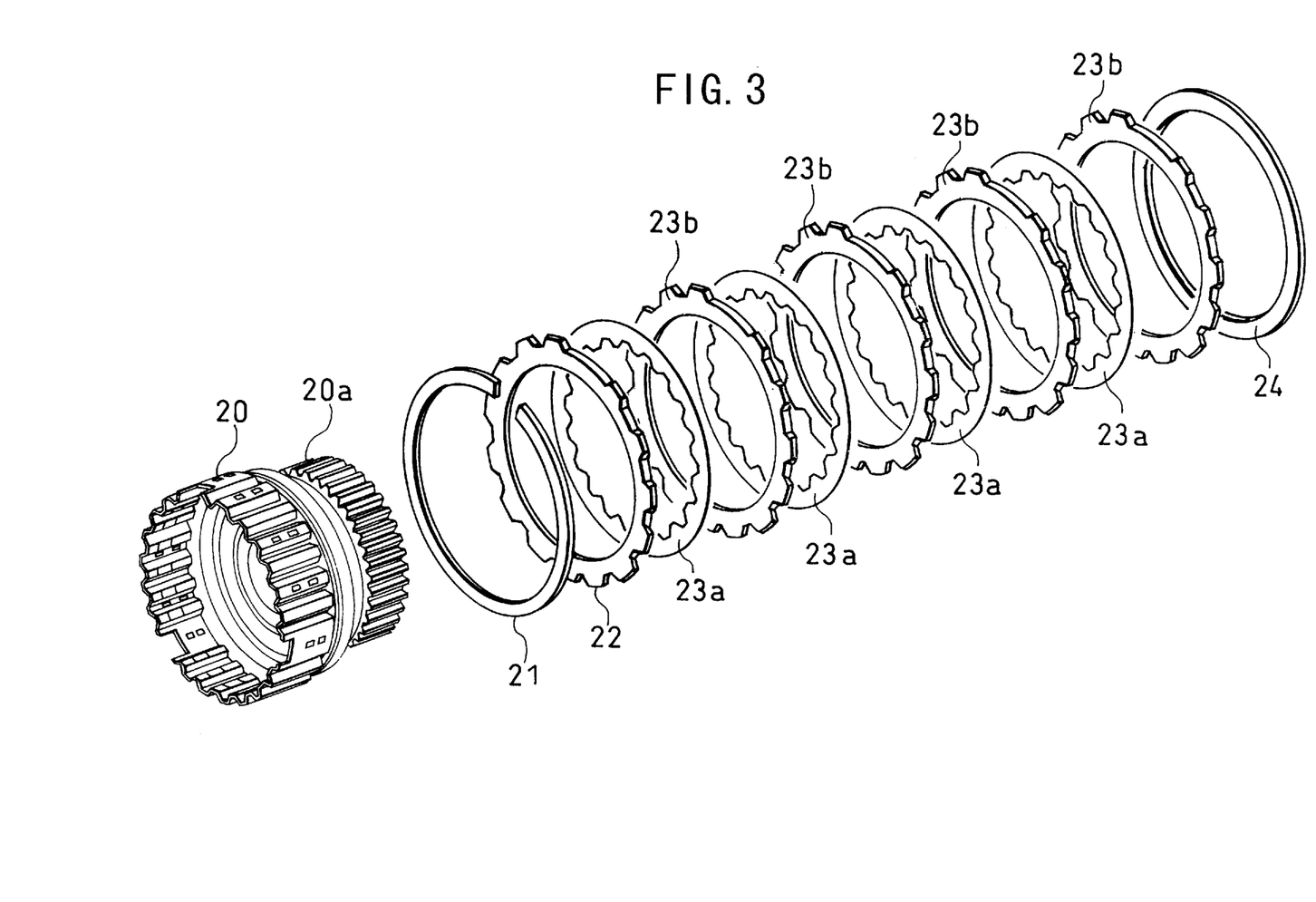
FIG. 3 is a partially exploded view of essential components constituting friction devices.
Figure 4:
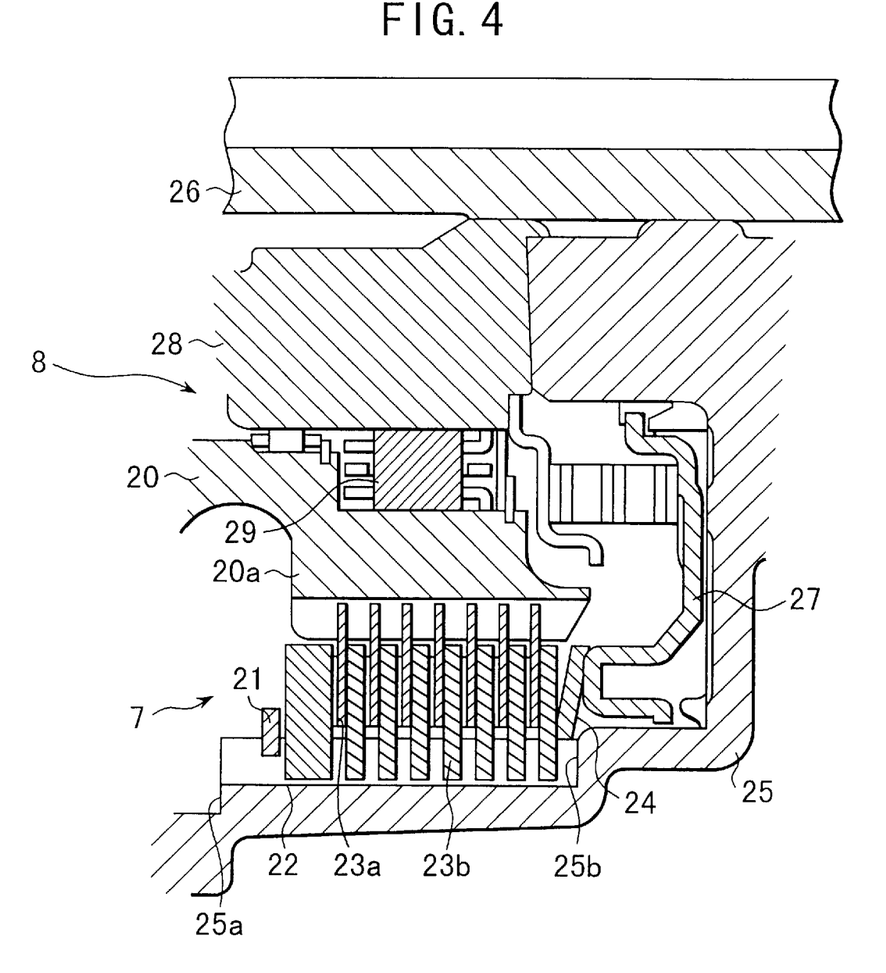
FIG. 4 is a partially sectional view showing the friction devices of FIG. 3.

FIG. 3 is a partially exploded view of essential components constituting friction devices. Further, FIG. 4 is a partially sectional view showing a lower half portion of the friction device with respect to the center line of a hollow reduction drive shaft 26 and an upper half having a similar construction is not shown. In FIG. 4, reference numeral 20*a* denotes a hub for the low & reverse brake 7. The hub 20*a* is integrally formed with a low clutch drum 20 constituting a power transmitting member of the transmission. The low one-way clutch 8 is disposed on the inner side of the hub 20*a*. Spline grooves are formed on the inner surface of a transmission housing 25. Further, a snap ring 21 is inserted to a circular groove provided on the inner surface of the housing 25 at the left (when viewed from FIG. 4) ends of the spline grooves. Further, a retaining plate 22 is inserted to a circular groove provided on the inner surface of the housing 25 adjacent to the snap ring 21. Further, a plurality of friction plates 23*a*, 23*b* are arranged interchangeably between the spline grooves of the hub 20*a* and the housing 25. At the right (when viewed from FIG. 4) ends of the spline grooves of the housing 25, a dish plate 24 is provided. The friction plates are of two kinds, drive plates 23*a* and driven plates 23*b*. The drive plate 23*a* has a plurality of protrusions around the inner periphery at a given interval and the protrusions are spline-fitted to spline grooves provided in the hub 20*a*. On the other hand, the driven plate 23*b* has a plurality of protrusions around the outer periphery at a given interval and the protrusions are spline-fitted to the spline grooves provided on the transmission housing side. Since the width of the spline grooves is formed more widely than that of the protrusions, clearances are formed between the spline grooves and the protrusions. The friction plates 23*a*, 23*b* are movable only in the axial direction.

When a hydraulic pressure is supplied from a fluid passage (not shown) to a piston 27, the piston 27 pushes the dish plate 24 toward the retaining plate 22, thereby the drive plates 23*a* and the driven plates 23*b* are closely contacted with each other to enable a power transmission between the friction plates 23*a*, 23*b*. Further, a plurality of sprags 29 are provided between an inner race 28 and the hub 20*a* which are arranged coaxially. The low one-way clutch 8 is constituted by the inner race 28, the hub 20*a* and the sprags 29. Further, the inner race 28 are tightened to the transmission housing 25 by bolts. Accordingly, when the hub 20*a* is rotated in the locking direction A, the rotation of the hub 20*a* is restricted by the one-way clutch 8. The locking direction A is a rotation direction of the hub 20*a*, as shown in FIG. 8, in which the sprags 29 are raised up so as to restrict or lock the rotation of the hub 72.

Figure 5:
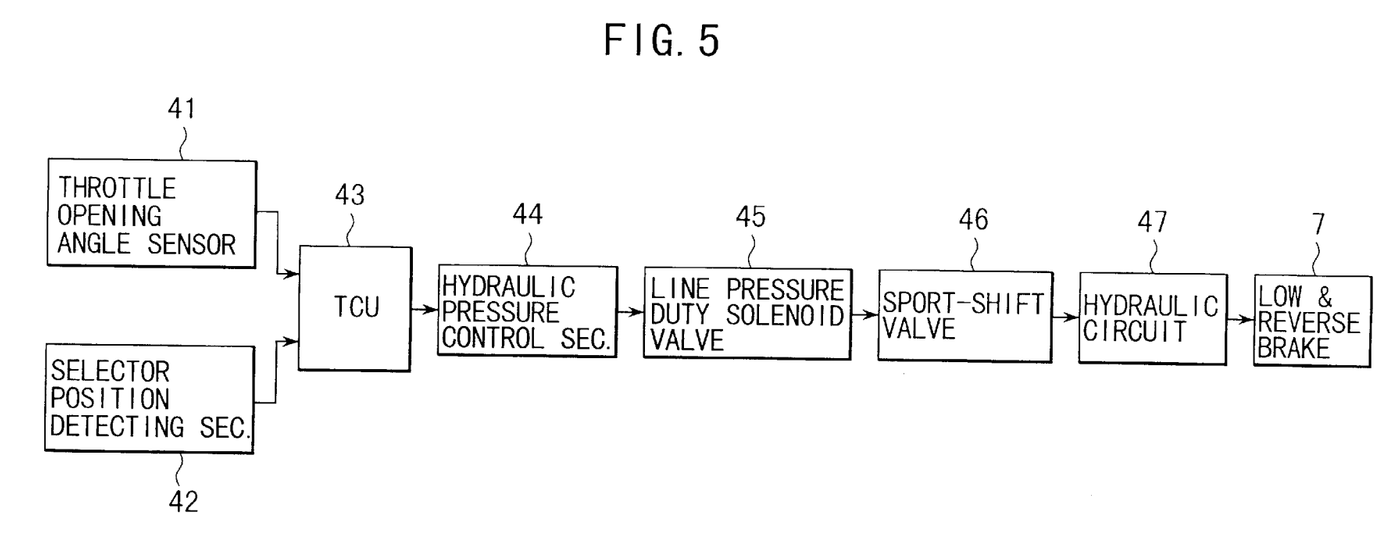
FIG. 5 is a schematic block diagram of a hydraulic control system for controlling hydraulic pressure of a low & reverse brake.

FIG. 5 is a schematic block diagram of a hydraulic control system for controlling a hydraulic pressure of a low & reverse brake 7. The scope of the present invention is an improvement of the low & reverse brake 7, therefore the control system is described only with respect to the low & reverse brake 7.

In the block diagram, a throttle opening angle sensor 41 is a sensor formed from an electromagnetic pick-up and the like for detecting a throttle opening angle θ. Further, a selector position detecting section 42 is for detecting a selector position such as "D", "1", "2" and the like as shown in FIG. 2. TCU (Transmission Control Unit) 43 is constituted by CPU, ROM, RAM, an input circuit and an output circuit. Signals outputted from miscellaneous sensors including the throttle opening angle sensor 41 and the selector position detecting section 42 are inputted to TCU 43. TCU 43 calculates miscellaneous calculations according to the information from these sensors to produce control values of the control system of the friction device to be controlled. The calculated control values are inputted to a hydraulic control section 44. The hydraulic control section 44 controls a line pressure duty solenoid valve 45 with a duty-ratio corresponding to an inputted control value. Further, a SPORT-shift valve 46 controls the low & reverse brake 7 by switching a release hydraulic pressure to an engagement hydraulic pressure and vice versa. A hydraulic circuit 47 is for communicating between the SPORT-shift valve 46 and the low & reverse brake 7. Accordingly, the hydraulic pressure controlled by the solenoid valve 45 and the SPORT-shift valve 46 is applied to the low & reverse brake 7, thereby the low & reverse brake 7 is engaged or released.

Figure 6:
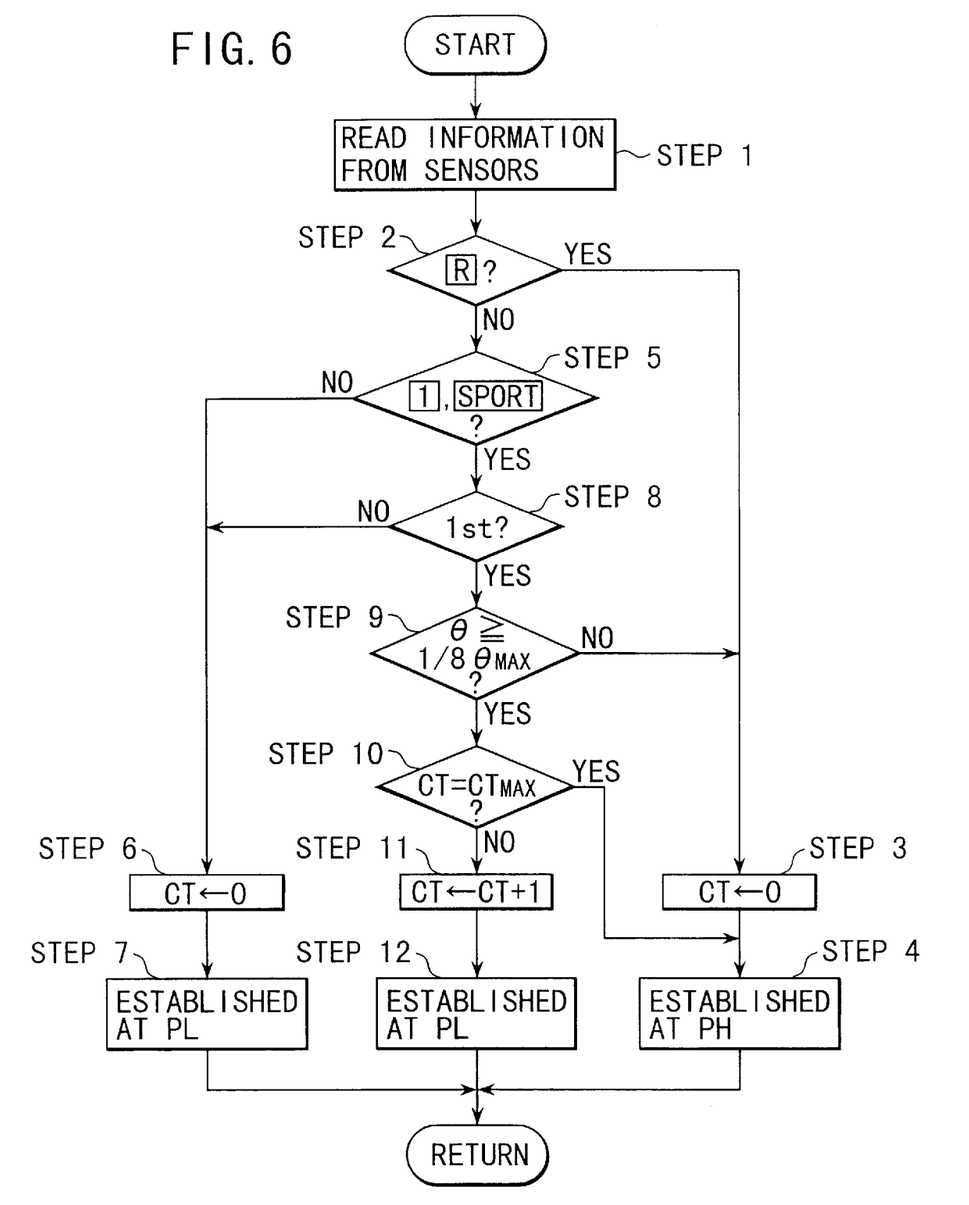
FIG. 6 is a flowchart showing steps for controlling hydraulic pressure of a low & reverse brake.
Figure 7:
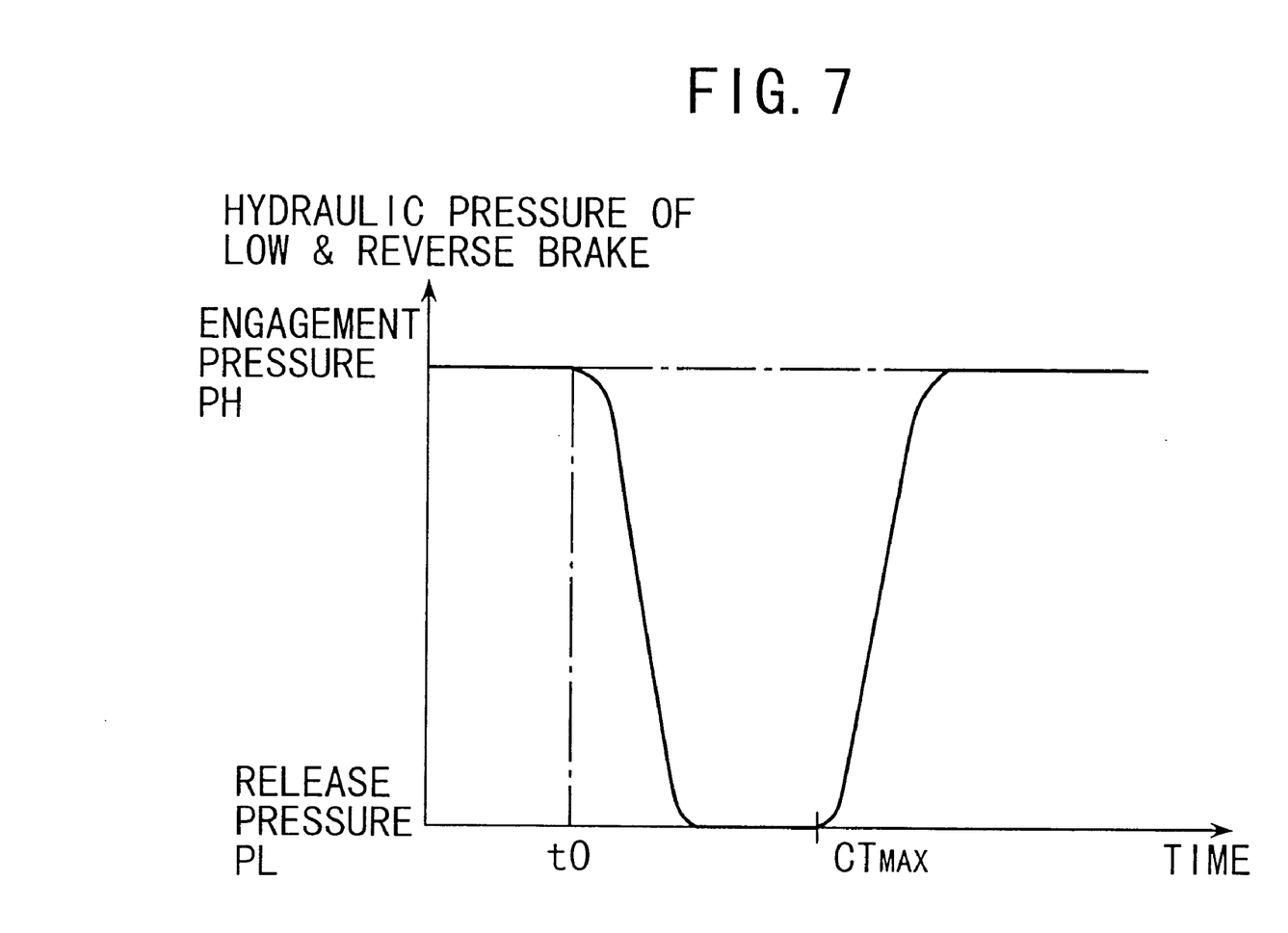
FIG. 7 is a graph showing changes of hydraulic pressure supplied to a low & reverse brake.

FIG. 6 is a flowchart showing processes of a program for controlling the low & reverse brake 7. The program is repeatedly executed according to the flowchart every 10 milliseconds. A counter CT employed in this program is for counting a release time when the low & reverse brake 7 is released temporarily and at the initial stage of the execution of the program, the counter is set to zero. Further, FIG. 7 is a timing chart showing the change of the hydraulic pressure supplied to the low & reverse brake 7.

First, at a step 1 information from miscellaneous sensors is read by TCU 43. Particularly, according to the embodiment of the present invention, the present throttle opening angle θ and the present selector position are important information.

Steps 2, 5 and 8 are ones for judging the selector position where the low & reverse brake 7 is engaged. At step 2, first, it is judged whether or not the present selector position is at "R" range. If it is judged that the present selector position is at "R" range, the counter CT is reset at a step 3 and then the hydraulic pressure of the low & reverse brake 7 is established at an engagement pressure $P_H$ (for example, maximum hydraulic pressure) at a step 4. Then, the program goes to RETURN to wait for the next execution of the program. Accordingly, as far as the selector position is set to "R" range, the steps 1,2,3 and 4 are repeatedly carried out and as a result the low & reverse brake 7 is maintained in the engagement condition.

In case where the selector is positioned at "D", "3"and "2" ranges, the program goes to steps 6 and 7. Further, in case where the selector is positioned at "1" range or "SPORT"mode, unless the gear is at 1st speed, the program also goes to steps 6 and 7. In these cases, the counter is reset at a step 6, then the hydraulic pressure of the low & reverse brake 7 is established at a release pressure $P_L$ (for example 0) at a step 7, and the program goes to RETURN. As far as these conditions continue, steps 1,2, 5 (and 8) are repeatedly executed, thereby the low & reverse brake 7 is maintained in the release condition.

Only in case where the selector is positioned at "1"range or "SPORT" mode and the gear is at 1st speed, steps after 9 are executed. In this case, at a step 9, it is judged whether or not the throttle opening angle θ is larger than a reference opening angle $θ_{th}$. The reference opening angle $θ_{th}$ is, for example, established so as to be 1/8of a maximum throttle opening angle. If the throttle opening angle θ is smaller than the reference opening angle $θ_{th}$, the counter is reset at the step 3 and the low & reverse brake 7 is established at the engagement pressure $P_H$ at the step 4. That is, even when the selector lever is positioned at "1" range or "SPORT" mode and the gear position is $1_{st}$ speed, if the throttle opening angle θ is smaller than the reference opening angle $θ_{th}$, the low & reverse brake 7 is not released. The reason will be described hereinafter.

On the other hand, if the throttle opening angle θ is larger than the reference opening angle $θ_{th}$, the program goes to steps 10 and after. At a step 11, initially the counter CT is established at θ (time is to as shown in FIG. 7). The counter is incremented by 1, then the low & reverse brake 7 is established at the release pressure $P_L$ at a step 12 and the program returns to START. The establishment of the release pressure $P_L$ is accomplished by controlling the SPORT-shift valve 46. Accordingly, in case where the selector position is "1" or "SPORT" and the gear position is $1_{st}$, as far as the throttle opening angle θ is larger than the reference opening angle $θ_{th}$, the low & reverse brake 7 is continued to be established at the release pressure $P_L$. At the same time, the counter CT is successively incremented until a specified time $CT_{max}$ elapses (see FIG. 7). In this embodiment, the specified time $CT_{max}$ is established to be for example 60. Therefore, an actual specified time is 600 milliseconds (10 milliseconds×60). When the specified time 600 milliseconds elapse, the program goes from the step 10 to the step 4 where the hydraulic pressure supplied to the low & reverse brake 7 changes from the release pressure $P_L$ to the engagement pressure $P_H$. After the specified time $CT_{max}$, the supplied pressure is held at the engagement pressure $P_H$. Thus, when the gear position is 1st at "1" range or "SPORT" mode and the throttle opening angle θ becomes larger than the opening angle $θ_{th}$, the low & reverse brake 7 is temporarily released during the timespan of the specified time $CT_{max}$.

If the gear position is up-shifted to 2nd speed before the specified time $CT_{max}$ elapses, the increment of the counter stops, at the step 6 the counter is reset and then the low & reverse brake 7 is released at the step 7. Further, if the throttle opening angle θ becomes smaller than the reference opening angle $θ_{th}$ before the specified time $CT_{max}$ elapses, the increment of the counter stops, at the step 3 the counter is reset and then the low & reverse brake 7 is engaged at the step 4.

The primary feature of this flowchart is to release the low & reverse brake 7 temporarily for the specified time, in case where the following two conditions (temporary off-condition) are satisfied at the same time.

Temporary Off-condition:
  (1) when the select lever is positioned at "1" range or "SPORT"mode and the gear position is at 1st speed; and
  (2) when the throttle opening angle θ is larger than the reference opening angle $θ_{th}$.

The reason why the low & reverse brake 7 is temporarily released if the above conditions are satisfied, is to prevent the load corresponding to the input torque from applying to the spline coupling portion of the friction plates by releasing the drive plates and the driven plates. Describing in detail with reference to FIG. 8, when the vehicle is accelerated at 1st speed, the hub 72 (corresponding to 20a in FIGS. 3 and 4) rotates in the locking direction A. In this case, the locking operation of the low one-way clutch 8 generates only when the hub 72 rotates by an amount of the displacement needed for raising up the sprags 73. As the hub 72 rotates, the clearance between the hub 72 and the drive plate 75 comes closer and closer and the drive plate 75 starts rotation. At this moment, if the low & reverse brake 7 is released, the driven plate 76 does not rotate. Accordingly, the protrusions of the driven plate 76 can be prevented from contacting with the protrusions of the spline grooves provided in the transmission housing 74 and as a result the load can be prevented from being applied to these protrusions.

The rotating state of the hub 72 in the locking direction, namely, the accelerating state of the hub 72 can be judged by monitoring the throttle opening angle θ. In this embodiment, it is judged that the hub 72 is in the accelerating state when the throttle opening angle θ exceeds the reference opening angle $θ_{th}$. When it is judged that the hub 72 is in the accelerating state, the low & reverse brake 7 is temporarily released from the instance of this judgment. The reference opening angle $θ_{th}$ is established at a proper value in consideration of an accuracy of the throttle opening angle sensor and a degree of the damage of the input torque to the friction plates. For example, in this embodiment, the reference opening angle $θ_{th}$ Of $1/8 θ_{max}$ is determined based on the judgment that $1/8 θ_{max}$ or smaller value would give a very small damage to the friction plates even if the hub 72 is in acceleration.

Further, it is necessary that the specified time $CT_{max}$ should be established at a longer time than a timespan for operating the low one-way clutch 8. As described before, the low one-way clutch 8 generates a locking operation by the raising-up of the sprags. Accordingly, first an amount of rotation of the hub 72 needed for raising up the sprags (this amount of rotation is called a locking rotation) is obtained. Then, a timespan needed for the locking rotation is calculated and a value slightly larger than the calculated timespan is established as a specified time $CT_{max}$. The specified time $CT_{max}$ of 600 milliseconds exemplified in this embodiment has been determined in this way.

This temporal release of the low & reverse brake 7 substantially prevents fatigues or damages of the drive plates 75 and driven plates 76. Particularly, since the drive plates 75 are formed thin for the structural reason, the fatigues of the drive plates have long been a problem in the prior art. The present invention can solve such a problem. Further, since it is not necessary to use expensive, durable materials for the friction plates, the automatic transmission can be manufactured low in cost.

The present invention can be applied to other friction devices for the automatic transmission which are engaged being interlocked with the one-way clutch than the low & reverse brake. Further, in this embodiment, the one-way clutch is disposed on the hub side, however otherwise the one-way clutch may be disposed on a rotatable drum in place of the transmission housing.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic transmission having a planetary gear set, a hub and a drum, comprising:

a plurality of first plates spline-fitted to said hub;

a plurality of second plates spline-fitted to said drum;

a friction engaging means including said first plates and said second plates disposed in an interleaving relation to said first plates;

an one-way clutch provided in said hub and having a plurality of sprags for locking the rotation of said hub when said hub rotates in a locking direction; and a control means for temporarily releasing said friction engaging means for a specified timespan when said friction engaging means is in an engagement condition and when said hub rotates in a locking direction.

2. The automatic transmission according to claim 1, wherein said timespan is established at a longer time than a time needed for locking the rotation of said hub.

3. The automatic transmission according to claim 1, wherein said control means starts to release said friction engaging means when a throttle opening angle exceeds a specified value.

4. An automatic transmission having a planetary gear set, a hub and a drum, comprising:

a plurality of first plates spline-fitted to said hub;

a plurality of second plates spline-fitted to said drum;

a friction engaging means including said first plates and said second plates disposed in an interleaving relation to said first plates;

an one-way clutch provided in said drum and having a plurality of sprags for locking the rotation of said drum when said drum rotates in a locking direction; and a control means for temporarily releasing said friction engaging means for a specified timespan when said friction engaging means is in an engagement condition and when said drum rotates in a locking direction.

5. The automatic transmission according to claim 4, wherein said timespan is established at a longer time than a time needed for locking the rotation of said drum.

6. The automatic transmission according to claim 4, wherein said control means starts to release said friction engaging means when a throttle opening angle exceeds a specified value.

* * * * *